United States Patent [19]
Nawata

[11] Patent Number: 5,991,598
[45] Date of Patent: Nov. 23, 1999

[54] BURST SIGNAL TRANSMISSION FROM AN EARTH STATION TO AN ORBITING SATELLITE WITH A SHORT GUARD TIME

[75] Inventor: Hizuru Nawata, Tokyo, Japan

[73] Assignee: NEC Corporation, Tokyo, Japan

[21] Appl. No.: 08/907,866

[22] Filed: Aug. 11, 1997

Related U.S. Application Data

[63] Continuation of application No. 08/268,455, Jun. 30, 1994, abandoned.

[30] Foreign Application Priority Data

Jun. 30, 1993 [JP] Japan .................................. 5-160697

[51] Int. Cl.⁶ .................................................. H04B 7/185
[52] U.S. Cl. ........................ 455/13.1; 455/13.2; 455/429; 455/430; 370/324
[58] Field of Search ................................. 455/13.2, 13.1, 455/12.1, 427, 428, 429, 430; 370/252, 253, 324, 503, 508

[56] References Cited

U.S. PATENT DOCUMENTS

| | | | |
|---|---|---|---|
| 4,010,420 | 3/1977 | Reiner et al. | 455/13.2 X |
| 4,292,683 | 9/1981 | Jueneman | 370/104 |
| 4,398,291 | 8/1983 | Hotta et al. | 370/104.1 X |
| 4,686,673 | 8/1987 | Hotta | 370/324 |
| 5,172,375 | 12/1992 | Kou | 370/104.1 X |
| 5,309,439 | 5/1994 | Roos | 370/508 |
| 5,363,373 | 11/1994 | Nakahara et al. | 455/13.2 X |
| 5,410,728 | 4/1995 | Bertiger et al. | 455/13.1 |
| 5,423,084 | 6/1995 | Vatt | 455/428 |

FOREIGN PATENT DOCUMENTS

| | | |
|---|---|---|
| 0009096 | 4/1980 | European Pat. Off. . |
| 0237972 | 9/1987 | European Pat. Off. . |
| 0365885 | 5/1990 | European Pat. Off. . |
| 181336 | 7/1989 | Japan . |

OTHER PUBLICATIONS

Takeuchi, et al., IEEE Global Telecommunications Conference, vol. 1, Dec. 1992, Orlando, FL, pp. 443–446.

"Nikkei Kommunikeisyon" (Nikkei Communications), No. 112, published by Nikkei BP, Oct. 21, 1991, pp. 31–32.

"Application of Motorola Satellite Communications, Inc. for a Low Earth Orbit Mobile Satellite System", FCC, Washington, D.C., Dec. 1990.

*Primary Examiner*—Wellington Chin
*Assistant Examiner*—Philip J. Sobutka
*Attorney, Agent, or Firm*—Sughrue, Mion, Zinn, Macpeak & Seas, PLLC

[57] ABSTRACT

Radiated from each orbiting satellite of a satellite communication network to M cells (M representing an integer, such as thirty-seven) covered with a predetermined solid angle on the earth, M spot beams are identified by M identification codes. In an earth station which may be a portable unit, a burst signal transmitter device (31) comprises a receiver part (35) receiving one of the spot beams as a received beam at a reception time, to recognize as a recognized code one of the identification codes that identifies the received beam, and a transmitter part (45) for transmitting burst signals at a transmission time delayed from the reception time by an offset amount selected by the recognized code from M offset amounts predetermined for the identification codes. Preferably, the M offset amounts are stored in a memory (43).

31 Claims, 4 Drawing Sheets

BURST SIGNAL TRANSMISSION FROM AN EARTH STATION TO AN ORBITING SATELLITE WITH A SHORT GUARD TIME

This is a Continuation of application Ser. No. 08/268,455 filed Jun. 30, 1994 now abandoned.

BACKGROUND OF THE INVENTION

This invention relates to burst signal transmission, in a satellite communication network having a plurality of satellites orbiting the earth, between a great number of earth stations which may be fixed stations and/or selectively called mobile stations. In recent practice, the orbiting satellites are often called low earth orbit satellites. More particularly, this invention relates to a method of transmitting a burst signal from an arbitrary one of the earth stations to one of the orbiting satellites, to a burst signal transmitter device for use in such an earth station, and to a transponder for use on each orbiting satellite.

Satellites in geostationary orbit are in general use multiple access communication networks. Such a communication network was proposed circa 1950.

Large scale rockets have recently become available for launching small sized satellites accompanying a large sized satellite. Rockets have also been developed for launching small sized satellites. This has made it economical to launch small sized satellites. As a consequence, attention has been drawn to satellite communication networks employing a plurality of small sized orbiting satellites at low and/or middle orbit altitudes. Such satellite communication networks are superior to network using geostationary satellites because they allow shorter propagations delays between earth stations and compact transmission and reception terminals. As a typical example of communication networks using orbiting satellites, the IRIDIUM system of Motorola, Inc., U.S.A., is described in a report in the Japanese language in the periodical "Nikkei Kommunikeisyon" (Nikkei Communications), No. 112, published by Nikkei BP on the 21st of Oct. 1991, pages 31 to 32. This report is based on a paper entitled "Application of Motorola Satellite Communications, Inc., for a Low Earth Orbit Mobile Satellite System before the Federal Communications Commission, Washington, D.C., December 1990", of which eight pages are available to us, including the title page and two figure pages 1a and 1b.

As be described below in greater detail, it has been unavoidable to use a long guard time in a conventional burst signal transmitter of an earth station of such an orbiting satellite communication network the transmitting burst signals to other earth stations through one of orbiting satellites. The long guard time results in a reduced transmission efficiency.

SUMMARY OF THE INVENTION

It is consequently an object of the present invention to provide a burst signal transmitting method capable of transmitting, with a short guard time, a burst signal from an earth station of a satellite communication network comprising a predetermined plurality of orbiting satellites.

It is another object of this intention to provide a burst signal transmitting method of the type described capable of achieving an excellent transmission efficiency.

It is further object of this invention to provide a burst signal transmitter device using the burst signal transmitting method of the type described.

It is a further object of this invention to provide a transponder for use on an orbiting satellite of a satellite communication network including a plurality of earth stations, wherein each earth station comprises a burst signal transmitter device of the type described.

Other objects of this invention will become clear as the description proceeds.

In accordance with an aspect of this invention, there is provided a burst signal transmitting method of transmitting a burst signal from an earth station of a satellite communication network including a predetermined number of orbiting satellites, comprising the steps of: (A) beam transmitting from each of the satellites M spot beams with M identification codes superposed on the spot beams, respectively, where M represents an integer which is equal at least to two, with the identification codes rendered individually specific to the spot beams; (B) beam receiving in the earth station one of the spot beams as a received beam at a reception time instant from one of the satellites; (C) beam recognizing the above-mentioned one of spot beams by one of the identification codes that is superposed on the received beam; and (D) signal transmitting the burst signal to the above-mentioned one of the satellites at a transmission time instant delayed from the reception time instant by an offset amount selected from M offset amounts predetermined for the identification codes, respectively, where the offset amount is selected in response to the above-mentioned one of the identification codes.

In accordance with another aspect of this invention, there is provided a burst signal transmitter device which is used in an earth station of a satellite communication network including a predetermined number of orbiting satellites, each satellite radiating M spot beams identified by M identification codes, respectively, where M represents an integer equal at least to two and where the identification codes are individually specific to the spot beams, which is for transmitting a burst signal to one of the satellites that irradiates the earth station by one of the spot beams, and which comprises: (A) receiving means for receiving the above-mentioned one of spot beams from the above-mentioned one of satellites as a received signal at a reception time instant; (B) recognizing means for recognizing the above-mentioned one of spot beams by one of the identification codes that identifies the received signal; and (C) transmitter means for transmitting the burst signal to the above-mentioned one of the satellites at a transmission time instant delayed from the reception time instant by an offset amount selected from M offset amounts predetermined for the identification codes, respectively, with the offset amount selected in response to the above-mentioned one of the identification codes.

In accordance with a further aspect of this invention, there is provided a transponder mounted on an orbiting satellite of a satellite communication network including,a plurality of earth stations, each earth station transmitting a burst signal to the transponder with the shortest possible guard time to achieve alignment of the burst signal in time slots of the transponder with burst signals transmitted to the transponder from others of the earth stations, wherein the transponder comprises transmitter means for transmitting M spot beams to the earth station with M identification codes superposed on the spot beams, respectively, where M represents an integer which is equal at least to two and where the identification codes are individually specific to the spot beams.

BRIEF DESCRIPTION OF THE DRAWING

FIG. 7 depicted below FIG. 1, is a schematic time chart for describing operation of the transmitter device depicted in FIG. 6.

DESCRIPTION OF THE PREFERRED EMBODIMENTS

Figure 1:
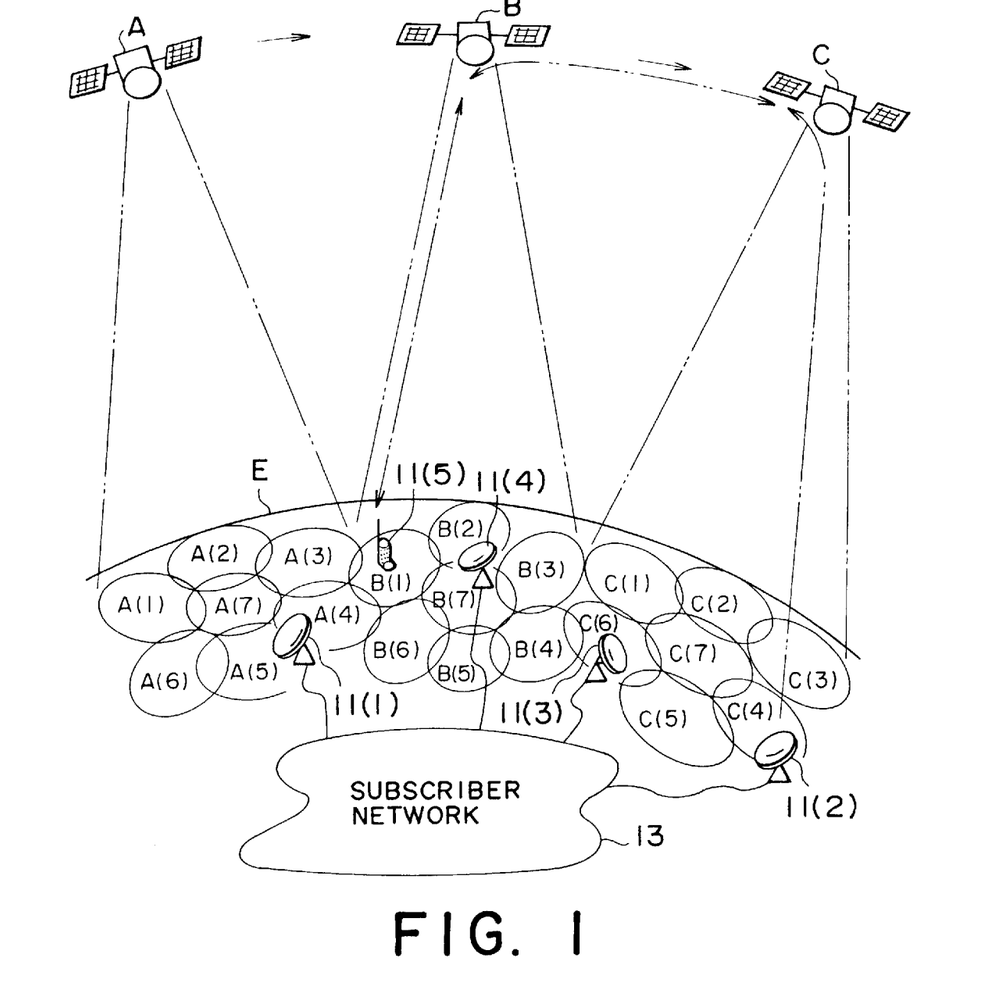
FIG. 1 is a schematic illustration of a satellite communication network in which is used a burst signal transmitter device according to the instant invention.
Figure 2:
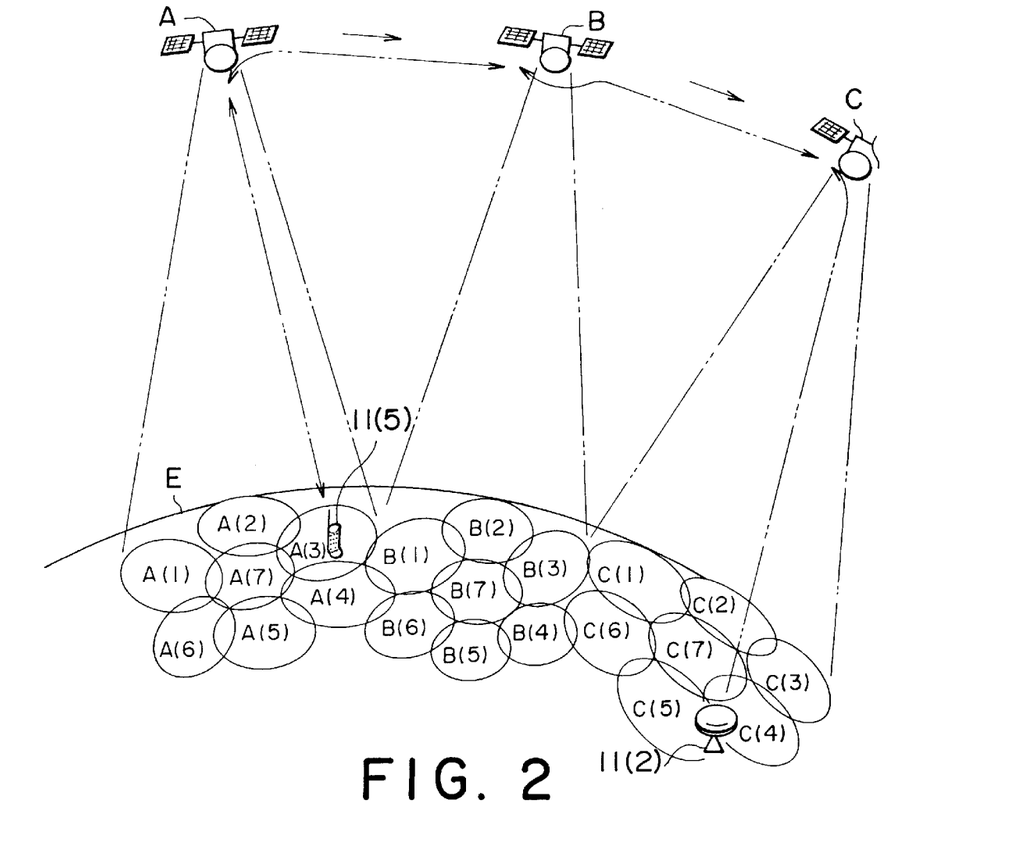
FIG. 2 is a schematic representation of the satellite communication network of FIG. 1 at a later time.
Figure 3:
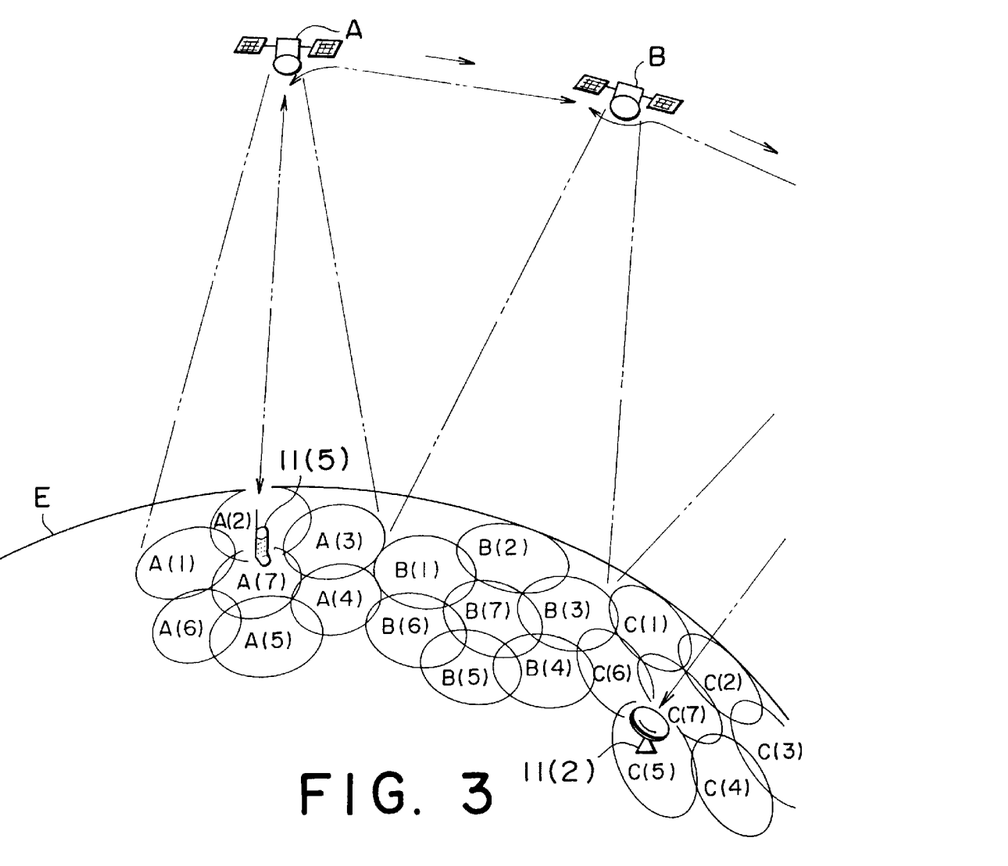
FIG. 3 is a schematic representation of the satellite communication network of FIG. 2 at a further later time.

Referring to FIGS. 1 to 3, the above-mentioned IRIDIUM system will first be described as an example of a satellite communication network which comprises a predetermined number of orbiting satellites and to which burst signal transmission according to the present invention is applicable. The satellites are orbiting on seven polar orbits, eleven in each orbit equidistantly along each longitude, about 745 km above the surface of the earth E, much lower than the known altitude of 36,000 km of a geostationary satellite. The seven polar orbits simultaneously revolve around the earth azimuthally. Three of the orbiting satellites are illustrated at A, B, and C and will be referred to as satellites A, B, and C and in general as a satellite S.

They satellites S revolves around the earth in approximately 100 minutes at a speed of 7.4 km per second and covers an S region of a diameter of 3,960 km on the earth's surface. Each of such regions has a predetermined shape and is similarly divided into first through M-th cells, each cell having a diameter of 470 km, where M represents an integer which is equal at least to two and may be equal to thirty-seven. It is possible to understand instead of the S region that an S solid angle is extended by the satellite S in the manner indicated by a pair of dash/two-dot lines.

In the example being illustrated, A(1) to A(7) cells are depicted in the A region, B(1) to B(7) cells in the B region, and C(1) to C(7) cells in the C region. In the S region, such cells will be called first through M-th cells S(1) to S(M). First to fifth earth stations 11(1), 11(2), 11(3), 11(4), and 11(5) are illustrated. These earth stations will be designated either collectively or individually by a single reference numeral 11 without addition thereto of the suffixes enclosed with parentheses, and may be fixed stations and/or selectively called mobile stations. The first to the fourth earth stations 11 are fixed stations and are connected to a subscriber network 13 including a plurality of subscriber substations (not shown). The fifth earth station 11(5) is a portable unit, which may either be carried by a user moving on the earth's surface or be installed on a space craft, such as an airplane. In FIGS. 2 and 3, only the second earth station 11(2) and the mobile station 11(5) are depicted as terrestrial, merely for simplicity of illustration. In FIG. 3, the C satellite is assumed to have moved away from the scene.

The satellites A, B, and C are capable of communicating, via a pair of up and down links, with the earth stations 11 which are currently covered by their respective solid angles. The satellite S can communicate with each of a prescribed number of adjacent satellites through a pair of bidirectional intersatellite links. Each link is a voice and data link and is exemplified by a dash/two-dot line. It should be noted that some of such lines are also used in indicating the solid angles.

Each fixed station 11 is a network control station for connecting communication channels between the satellite S and the subscriber substations when currently covered by the S solid angle. The network control station can also connect the satellite S and the subscriber substations when currently covered by a solid angle of one of the adjacent satellites. Furthermore, the network control station 11 administers the subscriber substations and charges or bills for communication services. One of the network control stations 11 additionally serves as a reference station to administer the whole communication network. The mobile station 11(5) is capable of communicating with at least one of the subscriber substations through one of the network control stations 11 that may be located near the mobile station 11(5) under consideration in the manner known in a cellular mobile communication network.

In order to establish the down links, the satellite S radiates or directs first through M-th spot beams to the first through the M-th cells S(1) to S(M) in the S solid angle, respectively. Such spot beams are radiated towards the cells in a manner which is known in the art and is out of the scope of this invention. The up links are established in a manner which will become clear as the description proceeds. In each cell which will be referred to as an m-th cell S(m), where m is variable between 1 and M, both inclusive, a certain number of a different frequencies are reused in order to effectively use a frequency band. Use of the spot beams is effective to save power in each satellite. In the S region, distances may differ from one cell to another cell between centers of the cells S(1) to S(M) and the satellite S. This gives rise to differences between the cells in propagation delays through the up and the down links.

In FIG. 1, where the A to the C satellites are at certain locations above the earth E at a certain time instant, the first earth station 11(1) is in the A(5) cell, the second earth station 11(2) in the C(4) cell, the third earth stations 11(3) in the C(6) cell, the fourth earth station 11(4) in the B(2) cell, and the mobile station 11(5) in the B(2) cell. In FIG. 2, where a certain time interval elapses from the time instant mentioned in conjunction with FIG. 1, the second earth station 11(2) and the mobile station 11(5) are in the C(5) and the A(3) cells. In FIG. 3, after a certain additional time interval relative to the time instant depicted in FIG. 2, the second earth station 11(2) and the mobile station 11(5) are covered by the C(5) and the A(2) cells. In the meantime, the mobile station 11(5) may move from one place to another place on or near the earth's surface. It is possible to understand the movement of the mobile station 11(5) as orbiting of the satellite S.

In FIGS. 1 to 3, a common frequency channel is used by to the earth stations 11 with division of the channel along a time axis. Examples are a time division multiple access (TDMA) communication system and a slotted ALOHA communication system. In such communication systems, transmission and reception of burst signals are mandatory in the earth stations, such as 11, which use the communication system and are spread over a wide geographic area. When sent to the satellite S, the burst signals must be received with alignment achieved in time slots on the satellite S. It can be assumed that, in general, such burst signals are transmitted to the satellite S as at least one uplink signal from at least one of the earth stations 11 that is currently present in the S solid angle.

Figure 4:
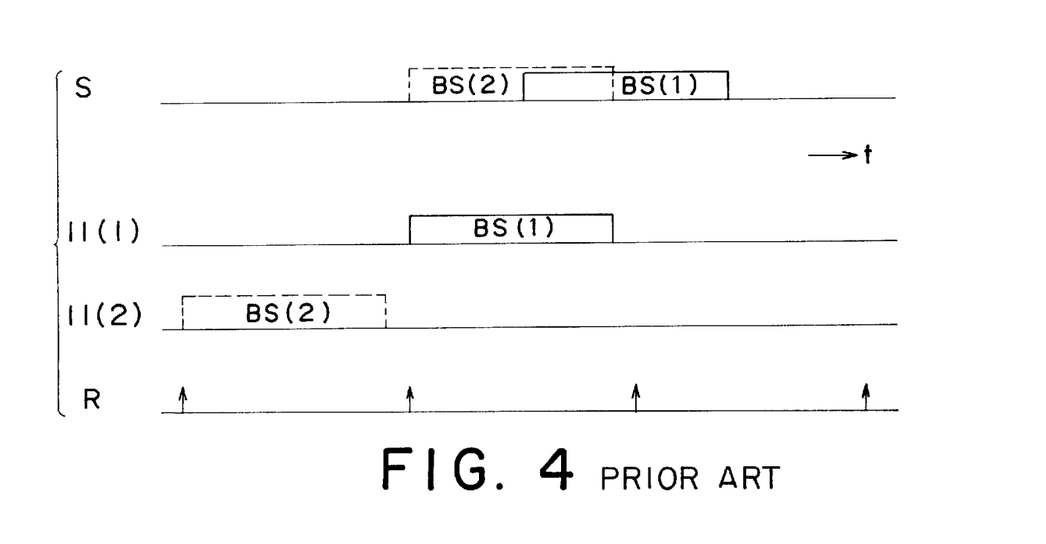
FIG. 4 depicted below FIG. 2, schematically shows a time chart for describing operation of a conventional burst signal transmitter device.

Turning to FIG. 4 with FIGS. 1 to 3 continuously referred to, a time axis t of the satellite S and of the earth stations 11 is depicted along a first or top row labelled S. It will be presumed that the first and the second earth stations 11 transmit first and second burst signals BS(1) and BS(2) towards the satellite S in the manner exemplified along second and third rows labelled 11(1) and 11(2). It will be assumed that on transmitting the first and the second burst signals, the first and the second earth stations 11 refer to reference time instants which may be defined by the above-mentioned reference station, and are indicated by short upright arrows along a fourth or bottom row labelled R.

Due to the differences in the propagation delays mentioned before, the first and the second burst signals are received on the satellite S at different time instants. In the example depicted along the first row, the first and the second burst signals partly overlap each other as illustrated at BS(1) and BS(2). In order to align the burst signals in the time slots on the satellite S the earth stations 11 must transmit such burst signals with a long guard time between the burst signals. The guard time must be long enough to cope with all differences in the propagation delay. This is, however, objectionable because it results in deteriorated transmission efficiency of voice and data.

Figure 5:
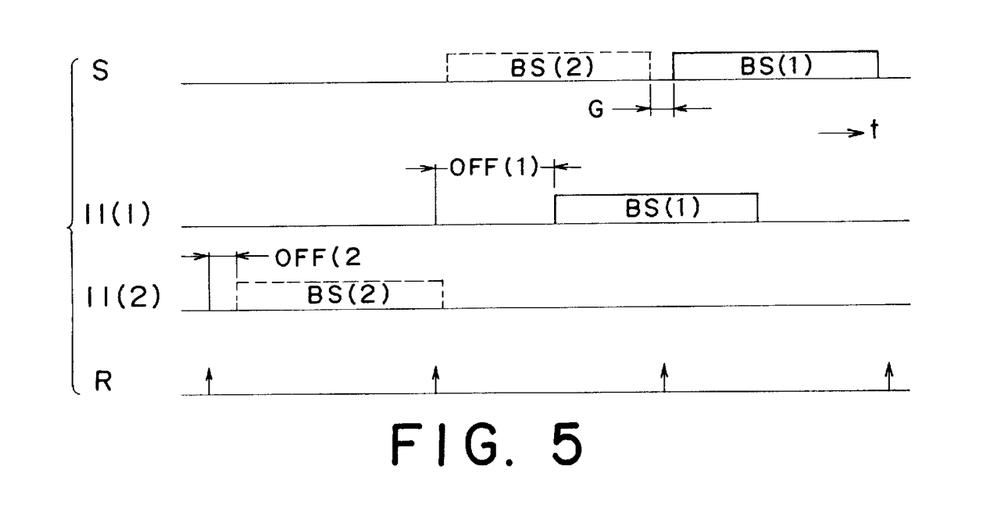
FIG. 5 drawn below FIG. 3, schematically shows a time chart for describing operation of another burst signal transmission device.

Further turning to FIG. 5 with FIGS. 1 to 3 continually referred to, the time axis t is illustrated along a first or top row labelled S with the time axis partitioned into time slots by short upright arrows. Like in FIG. 4, first and second burst signals are transmitted from the first and the second earth stations 11 as depicted along second and third rows labelled 11(1) and 11(2). By the reference station, reference time instants are defined in the manner depicted along a fourth or bottom row labelled R. On the satellite S, the time slots are defined in relation to the reference time instants.

From the first and the second earth stations 11(1) and 11(2), the first and the second burst signals are now sent to the satellite S with shifts of first and second offset amounts OFF(1) and OFF(2) relative to the reference time instants. Such offset amounts are decided so that these burst signals are received at the satellite S in alignment with the time slots with a guard time G interposed therebetween.

It is known to decide the offset amounts in accordance with a predetermined value that depends on the location of an earth station on the earth's surface in a satellite communication network comprising a geostationary satellite. An example is disclosed in Japanese Patent Prepublication (A) No. 181,336 of 1989. It is, however, impossible in the satellite communication network under consideration to use these known offset amounts. More specifically, the satellite S moves relative to the earth stations 11 during communication. The propagation delay accordingly varies.

Referring now afresh to FIG. 6 and again to FIGS. 1 through 3, the description will proceed to a transponder 15 which should be mounted on the satellites and is made according to a preferred embodiment of this invention. The transponder 15 comprises a transponder receiver device (RX) 17 and a transponder or beam transmitter device (TX) 19.

Figure 6:
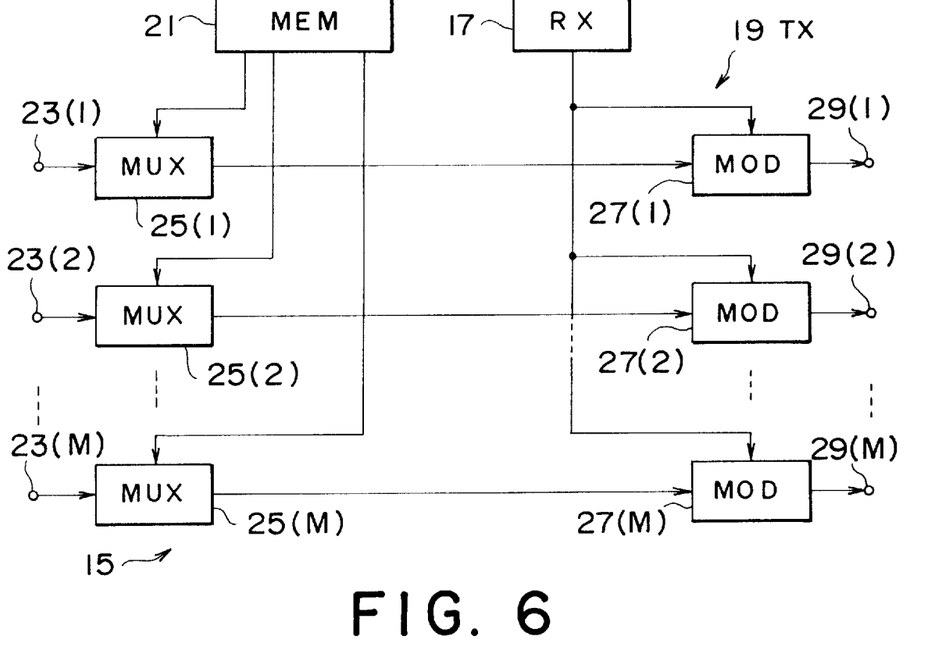
FIG. 6 is a block diagram of a transmitter device of a transponder on board a satellite illustrated in FIG. 1, according to an embodiment of an aspect of this invention.

The transponder receiver device 17 is for receiving inter-satellite link signals from the adjacent satellites and uplink signals from the earth stations 11 which are currently covered by the S solid angle. Each of the intersatellite link signals and the uplink signals comprises burst signals.

It is assumed that at least one earth station 11 is currently present in the S solid angle. It is furthermore assumed that the receiver device 17 discriminates this at least one earth station 11 by its station identification number. Detecting the burst signals in the intersatellite and the uplink signals, the receiver device 17 produces, as transponder reception signals, the burst signals which should be relayed in the down link or links to the earth station or stations.

The transponder or beam transmitter device 19 comprises a memory unit (MEM) 21 in which are stored first through M-th unique identification codes ID(1) to ID(M) which will either collectively or separately be designated by "ID". Inasmuch as the integer M is typically equal to thirty-seven, each identification code is represented by six bits. It is therefore preferred to make the first through the M-th identification codes additionally indicate the satellite S with the satellite S differentiated from each of the adjacent satellites.

The transmitter device 19 radiates the first through the M-th spot beams, which define the S solid angle. The identification codes are individually specific to the spot beams. If desired, the identification codes are preliminarily transmitted to the receiver device 17 for storage in the memory unit 21 from the above-mentioned reference station either directly or through the adjacent satellite or satellites.

In the transmitter device 19, first to M-th carrier input terminals 23(1), 23(2), . . . , and 23(M) or "23" are supplied with a carrier signal as first to M-th carrier signals with the frequencies reused. As a consequence, the carrier input terminals 23 serve as carrier generating means. Being equal in number to M, the first to the M-th carrier signals are in one-to-one correspondence to the first to the M-th identification codes.

Connected to the memory unit 21 and to the first to the M-th carrier input terminals 23, first through M-th multiplexers (MUX) 25(1) to 25(M) or 25 multiplex the first to the M-th identification codes on the first to the M-th carrier signals to produce first to M-th code multiplexed or superposed signals. In the manner which will presently be described, each identification code is repeatedly multiplexed at predetermined superposition time instants on the corresponding one of the carrier signals. In other words, each identification code is used periodically.

Supplied with the first to the M-th code multiplexed signals, respectively, and with the transponder reception signals simultaneously, first through M-th modulators (MOD) 27(1) to 27(M) or "27" modulate the first to the M-th multiplexed signals in a time division fashion with the reception burst signals used as modulating signals and with amplification into first to M-th modulated signals. Delivered through first through M-th modulator output terminals 29(1) to 29(M) or "29" to satellite antennas depicted in FIGS. 1 to 3, the first to the M-th modulated signals are radiated as the first to the M-th spot beams, respectively, in the down links into the S solid angle. Modulating the spot beams is possible in various manners as will be described next.

In the intersatellite link and the uplink signals, the burst signals may be directed to earth stations 11 which are currently covered by a different solid angle other than the S solid angle. In this event, similar modulators (not shown) produce time division modulated signals with amplification for radiation through different antennas of the satellite S to the adjacent satellite or satellites.

The carrier signals may first be modulated into modulated signals and the identification codes may later be superposed on the modulated signals with amplification for use as the spot beams in the down links. It is also possible to supply the carrier input terminals 23 with M carrier signals modulated simultaneously by at least one modulating signal and that the "modulators" 27 would then amplify the modulated and superposed signals. In addition, it is possible to supply the "carrier" input terminals 23 simultaneously with the at least one modulating signal (with the modulators 27 understood to generate M carrier signals) and to modulate the carrier signals by the M identification code superposed modulating signals.

Figure 7:
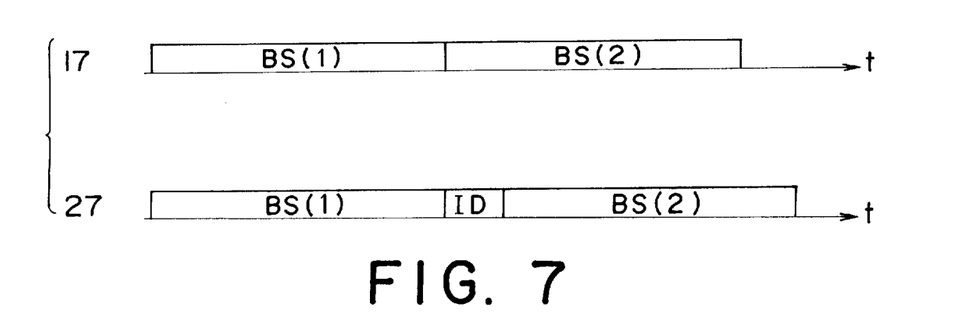

Turning to FIG. 7 with FIG. 6 continuously referred to, time axes t are scaled horizontally. Along an upper row labelled 17, the transponder receiver device 17 produces first and second burst signals BS(1) and BS(2) for use in the transponder transmitter device 19 as the modulating signals. Along a lower row labeled 27, the modulator 27 time division modulates with the modulating signals the code superposed signal in which one of the first to the M-th identification codes is inserted between the first and the second burst signals as indicated at ID. It is understood that the modulators 27 modulate the first to the M-th code multiplexed signals, each by the modulating signals with reference to the superposition time instants in the time division fashion exemplified along the lower row.

Figure 8:
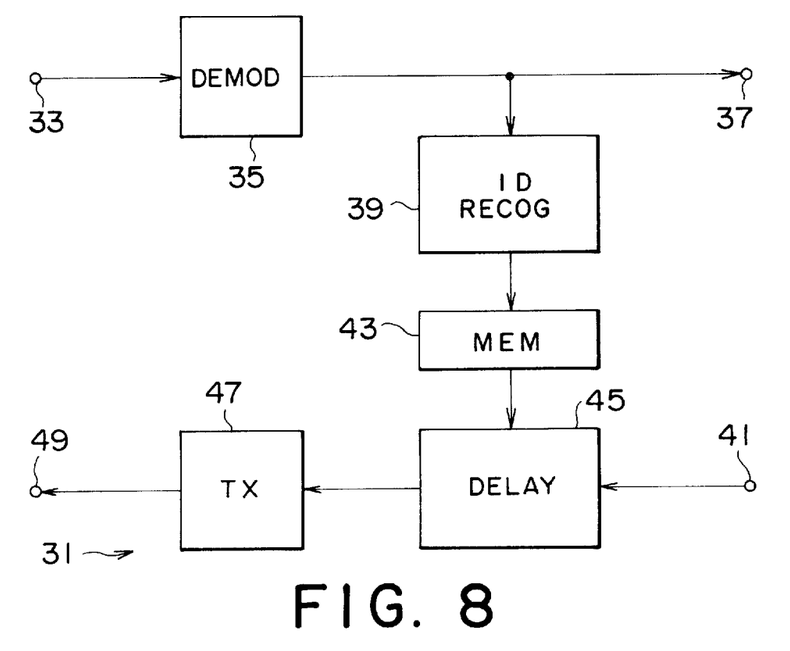
FIG. 8 is a block diagram of a transmitter device of an earth station depicted in FIG. 1.

Referring to FIG. 8 with FIGS. 1 to 3 and 6 referred to once again, attention will now be directed to a burst signal transmitter device 31 which is used in each of the earth stations 11 of the satellite communication network illustrated with reference to FIGS. 1 to 3 and is made according to a preferred embodiment of another aspect of this invention. In the manner described above, the satellite S of the satellite communication network radiates first to M-th spot beams identified by first through M-th identification codes ID(1) to ID(M), respectively, in down links in the S solid angle. It is surmised that the earth station under consideration is currently covered with the S solid angle and positioned in the afore-mentioned m-th cell S(m) to which the S satellite radiates an m-th spot beam identified by an m-th identification code ID(m) of the first to the M-th identification codes ID among the first to the M-th spot beams.

The burst signal transmitter device 31 comprises a beam receiver part having a receiver input terminal 33 receiving the m-th spot beam as a received beam at a reception time instant. Connected to the receiver input terminal 33, a demodulator (DEMOD) 35 demodulates the received beam into a demodulated signal, which is alternatively called a received signal. When the m-th spot beam is modulated by the modulating signal carrying data information which is voice and/or data destined to the earth station in question, the demodulator 35 recognizes the data information in the known manner and further demodulates the demodulated signal into the data information for delivery to a receiver output terminal 37.

Supplied with the demodulated signal, a recognition unit (ID RECOG) 39 recognizes the m-th identification code in the demodulated signal to produce a recognition signal indicative of the m-th identification code. The burst signal transmitter device 31 thereby knows that the earth station in question is currently present in the m-th cell defined by the satellite S. For use in discrimination, the recognition unit 39 is preliminarily loaded with the first to the M-th identification codes.

In the burst signal transmitter device 31, a burst signal transmitter part has a transmitter input terminal 41 supplied with burst signals for transmission to one of the orbiting satellites that currently covers the earth station under consideration with its solid angle. In order to achieve the alignment of these burst signals in the time slots on the satellite in question with other burst signals which may be transmitted from other earth stations covered with this solid angle, a memory unit (MEM) 43 is preliminarily loaded, as stored amounts, with offset amounts predetermined for the first to the M-th identification codes, respectively.

Sent from the recognition unit 39, the recognition signal selects one of the stored amounts as a selected amount that is predetermined for the m-th identification code. Supplied with the burst signals and with the selected amount, a delay unit (DELAY) 45 delays the burst signals into delayed signals by the selected amount relative to the reception time instant. A transmitter (TX) 47 transmits the delayed signals through a transmitter output terminal 49 towards the satellite S from which the m-th spot beam is currently received. It is now understood that the delayed signals are transmitted to the satellite S as a burst signal in the up link at a transmission time instant delayed by the selected amount from the reception time instant.

When it is desired to send data information to an earth station, which may eventually be the portable unit 11(5), it is possible to make the data information and a station identification number of the destination earth station modulate the burst signals supplied to the transmitter input terminal 41. In FIG. 8 an arrowhead is attached to a line drawn from the recognition unit 39 to the memory unit 43 to indicate selecting means responsive to the reception signal for selecting the offset amount from the offset amounts stored in the memory unit 43.

In practice, a station identification number of the earth station under consideration is used to modulate the burst signals fed to the transmitter input terminal 41. Receiving the burst signal, the transponder 15 (FIG. 6) can know in which of the cells of the A, B, C, and other satellites currently positioned is the earth station to which the modulating signal should be transmitted. It is consequently possible to modulate by the modulating signal only a particular one of the spot beams that is radiated to a particular cell either directly or through at least one of other satellites of the communication network.

What is claimed is:

1. A burst signal transmitting method of transmitting a burst signal from an earth station of a satellite communication network including a predetermined number of orbiting satellites, comprising the steps of;

beam transmitting from each of said satellites M spot beams with M identification codes superposed on said spot beams, respectively, where M represents an integer which is equal to at least two, said identification codes being individually specific to said spot beams and for identification and recognition of said spot beams;

beam receiving in said earth station one of said spot beams as a received beam at a reception time instant from one of said satellites;

beam recognizing said one of said spot beams by one of said identification codes that is superposed on said received beam; and a signal transmitting said burst signal to said one of said satellites at a transmission time instant following said reception time instant by an offset amount selected from M offset amounts predetermined for said identification codes, respectively, said offset amount being selected by said earth station in response to said one of said identification codes.

2. A burst signal transmitting method as claimed in claim 1, wherein said beam transmitting step comprises the steps of:

superposing said identification codes on M carrier signals to produce superposed signals;

modulating each of superposed signals by modulating signals into a modulated signal; and transmitting said modulated signal as one of said spot beams.

3. A burst signal transmitting method as claimed in claim 2, said carrier signals being in one-to-one correspondence to said identification codes, wherein:

said superposing step comprises the step of superposing each identification code one corresponding one of said carrier signals at predetermined superposition time instants to provide a superposed signal;

said modulating step comprising the step of modulating said superposed signal by said modulating signals with reference to said superposition time instants.

4. A burst signal transmitting method as claimed in claim 1, wherein:

said beam receiving step comprises the steps of:
  receiving said one of spot beams as said received beam at said reception time instant; and
  demodulating said received beam into a demodulated signal including said one of identification codes;
  said beam recognizing step comprising the step of recognizing said one of spot beams by locating said one of identification codes in said demodulated signal.

5. A burst signal transmitting method as claimed in claim 4, wherein said signal transmitting step comprises the step of:

storing said offset amounts as stored amounts; and selecting one of said stored amounts as said offset amount in response to said demodulated signal.

6. A burst signal transmitter device of an earth station of a satellite communication network including a predetermined number of orbiting satellites, each satellite radiating M spot beams identified by M identification codes, respectively, where M represents an integer which is equal at least to two, said identification codes being individually specific to said spot beams and for identification and recognition of said spot beams, said burst signal transmitter device transmitting a burst signal to one of said satellites that irradiates said earth station by one of said spot beams, said burst signal transmitter device comprising:

receiver means for receiving said one of said spot beams from said one of said satellites as a received signal at a reception time instant;

recognizing means for recognizing said one of said spot beams by one of said identification codes that identifies said received signal; and transmitter means for transmitting said burst signal to said one of said satellites at a transmission time instant following said reception time instant by an offset amount selected from M offset amounts predetermined for said identification codes, respectively, said offset amount being selected by said earth station in response to said one of said identification codes.

7. A burst signal transmitter device as claimed in claim 6, wherein:

said receiver means comprises demodulator means for demodulating said one of spot beams into a demodulated signal used as said received signal;

said recognizing means recognizing, to produce a recognition signal indicative of said one of identification codes, that said demodulated signal is derived from said one of spot beams with said one of identification codes included in said demodulated signal.

8. A burst signal transmitter device as claimed in claim 7, said one of spot beams being modulated by a burst signal carrying data information directed to said earth station, wherein said demodulator means further demodulates said demodulated signal into said data information.

9. A burst signal transmitting device as claimed in claim 7, wherein said transmitter means comprises:

memory means in which said offset amounts are stored as stored amounts;

selecting means responsive to said recognition signal for selecting said offset amount from said stored amount as a selected amount; and delay means for delaying transmission of said burst signal by said selected amount from said reception time instant.

10. A burst signal transmitter device as claimed in claim 9, wherein said burst signal is supplied to said delay means with data information carried thereby.

11. A transponder mounted on an orbiting satellite of a satellite communication network including a plurality of earth stations, wherein said transponder comprises transmitter means for transmitting M spot beams to said earth stations with M identification codes superposed on said spot beams, respectively, where M represents an integer which is equal at least to two, said identification codes being individually specific to said spot beams and for identification and recognition of said spot beams, each said earth station transmitting a burst signal to said transponder with a guard time based on which of said spot beams was transmitted to said earth station, to achieve alignment of said burst signal in time slots on said transponder with burst signals transmitted to said transponder from others of said earth stations.

12. A transponder as claimed in claim 11, wherein said transmitter means comprises:

carrier generating means for generating M carrier signals;

superposing means for superposing said identification codes on said carrier signals, respectively, to produce M code superposed signals; and spot beam transmitting means for transmitting said code superposed signals as said spot beams, respectively.

13. A transponder as claimed in claim 12, wherein said spot beam transmitting means comprises means for time division modulating each of said code superposed signals by at least one modulating signal into a modulated signal for transmission as one of said spot beams.

14. A transponder as claimed in claim 13, said satellite communication network including a prescribed number of adjacent satellites having a substantially predetermined positional relationship to said orbiting satellite, said transponder covering a solid angle by said spot beams and further comprising receiver means for receiving intersatellite link signals from said adjacent satellites and at least one uplink signal from at least one of said earth stations that is currently present in said solid angle, said receiving means detecting in said intersatellite link and said uplink signals at least one received signal for use as said at least one modulating signal for transmission into said solid angle.

15. A transponder as claimed in claim 11, wherein said transmitter means comprises:

carrier generating means for generating M carrier signals;

modulator means for time division modulating each of said carrier signals by at least one modulating signal to produce M modulated signals from said carrier signals; and superposing means for superposing said identification codes on said modulated signals, respectively, to produce M code superposed signals for transmission as said spot beams, respectively.

16. A transponder as claimed in claim 15, said satellite communication network including a prescribed number of adjacent satellites having a substantially predetermined positional relationship to said orbiting satellite, said transponder covering a solid angle by said spot beams and further comprising receiver means for receiving intersatellite link signals from said adjacent satellites and at least one uplink signal from at least one of said earth stations that is currently present in said solid angle, said receiving means detecting in said intersatellite link and said uplink signals at least one received signal for transmission as said at least one modulating signal for transmission into said solid angle.

17. A transponder as claimed in claim 11, wherein said transmitter means comprises:

superposing means for superposing said identification codes on a modulating signal to produce M code superposed modulating signals;

modulator means for modulating a carrier signal by said code superposed modulating signal to produce M code superposed and modulated signals, respectively; and means for transmitting said code superposed and modulated signals as said spot beams, respectively.

18. A transponder as claimed in claim 17, said satellite communication network including a prescribed number of adjacent satellites having a substantially predetermined positional relationship to said orbiting satellite, said transponder covering a solid angle by said spot beams and further comprising receiver means for receiving intersatellite link signals from said adjacent satellites and at least one uplink signal from at least one of said earth stations that is currently present in said solid angle, said receiving means detecting in said intersatellite link and said uplink signals a received signal for transmission as said modulating signal into said solid angle.

19. A burst signal transmitter device of an earth station of a satellite communication network including a predetermined number of orbiting satellites, each satellite radiating M spot beams identified by M identification codes, respectively, where M represents an integer which is equal at least to two, said identification codes being individually specific to said spot beams and for identification and recognition of said spot beams, said burst signal transmitter device transmitting a burst signal to one of said satellites that irradiates said earth station by one of said spot beams, said burst signal transmitter device comprising:

a receiver for receiving said one of said spot beams from said one of said satellites as a received signal at a reception time instant;

a transmitter for transmitting said burst signal to said one of said satellites at a transmission time instant following said reception time instant by an offset amount selected from M offset amounts predetermined for said identification codes, respectively, said offset amount being selected by said earth station in response to said one of said identification codes;

wherein said burst signal transmitter device recognizes said one of said spot beams by one of said identification codes that identifies said received signal.

20. A burst signal transmitter device as claimed in claim 19, wherein:

said receiver comprises a demodulator for demodulating said one of spot beams into a demodulated signal used as said received signal; and wherein said burst signal transmitter device recognizes, to produce a recognition signal indicative of said one of identification codes, that said demodulated signal is derived from said one of spot beams with said one of identification codes included in said demodulated signal.

21. A burst signal transmitter device as claimed in claim 20, said one of spot beams being modulated by a burst signal carrying data information directed to said earth station, wherein said demodulator further demodulates said demodulated signal into said data information.

22. A burst signal transmitting device as claimed in claim 20, wherein said transmitter comprises:

a memory in which said offset amounts are stored as stored amounts;

a selector responsive to said recognition signal for selecting said offset amount from said stored amount as a selected amount; and a delay for delaying transmission of said burst signal by said selected amount from said reception time instant.

23. A burst signal transmitter device as claimed in claim 22, wherein said burst signal is supplied to said delay with data information carried thereby.

24. A transponder mounted on an orbiting satellite of a satellite communication network including a plurality of earth stations, wherein said transponder comprises a transmitter for transmitting M spot beams to said earth stations with M identification codes superposed on said spot beams, respectively, where M represents an integer which is equal at least to two, said identification codes being individually specific to said spot beams and for identification and recognition of said spot beams, each said earth station transmitting a burst signal to said transponder with a guard time based on which of said spot beams was transmitted to said earth station, to achieve alignment of said burst signal in time slots on said transponder with burst signals transmitted to said transponder from others of said earth stations.

25. A transponder as claimed in claim 24, wherein said transmitter comprises:

a carrier generator for generating M carrier signals;

a superposing circuit for superposing said identification codes on said carrier signals, respectively, to produce M code superposed signals; and a spot beam transmitter for transmitting said code superposed signals as said spot beams, respectively.

26. A transponder as claimed in claim 25, wherein said spot beam transmitter time division modulates each of said code superposed signals by at least one modulating signal into a modulated signal for transmission as one of said spot beams.

27. A transponder as claimed in claim 26, said satellite communication network including a prescribed number of adjacent satellites having a substantially predetermined positional relationship to said orbiting satellite, said transponder covering a solid angle by said spot beams and further comprising a receiver for receiving intersatellite link signals from said adjacent satellites and at least one uplink signal from at least one of said earth stations that is currently present in said solid angle, said receiver detecting in said intersatellite link and said uplink signals at least one received signal for use as said at least one modulating signal for transmission into said solid angle.

28. A transponder as claimed in claim 24, wherein said transmitter comprises:

a carrier generator for generating M carrier signals;

a modulator for time division modulating each of said carrier signals by at least one modulating signal to produce M modulated signals from said carrier signals; and a superposing circuit for superposing said identification codes on said modulated signals, respectively, to produce M code superposed signals for transmission as said spot beams, respectively.

29. A transponder as claimed in claim 28, said satellite communication network including a prescribed number of adjacent satellites having a substantially predetermined positional relationship to said orbiting satellite, said transponder covering a solid angle by said spot beams and further comprising a receiver for receiving intersatellite link signals from said adjacent satellites and at least one uplink signal from at least one of said earth stations that is currently present in said solid angle, said receiver detecting in said intersatellite link and said uplink signals at least one received signal for use as said at least one modulating signal for transmission into said solid angle.

30. A transponder as claimed in claim 24, wherein said transmitter comprises:

a superposing circuit for superposing said identification codes on a modulating signal to produce M code superposed modulating signals;

a modulator for modulating a carrier signal by said code superposed modulating signal to produce M code superposed and modulated signals, respectively, wherein said transmitter transmits said code superposed and modulated signals as said spot beams, respectively.

31. A transponder as claimed in claim 30, said satellite communication network including a prescribed number of adjacent satellites having a substantially predetermined positional relationship to said orbiting satellite, said transponder covering a solid angle by said spot beams and further comprising a receiver for receiving intersatellite link signals from said adjacent satellites and at least one uplink signal from at least one of said earth stations that is currently present in said solid angle, said receiver detecting in said intersatellite link and said uplink signals a received signal for transmission as said modulating signal into said solid angle.

* * * * *